(12) United States Patent
Genter et al.

(10) Patent No.: US 10,526,998 B2
(45) Date of Patent: Jan. 7, 2020

(54) PRESSURE CONTROLLED DYNAMIC SEAL WITH CAPTURED FLUID TRANSFER TUBES

(71) Applicant: CUMMINS INC., Columbus, IN (US)

(72) Inventors: David P. Genter, Columbus, IN (US); Terrence M. Shaw, Columbus, IN (US); Timothy A. Solzak, Indianapolis, IN (US); Stephen Cox, Columbus, IN (US); Donald P. Leclerc, Seymour, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/269,770

(22) Filed: Feb. 7, 2019

(65) Prior Publication Data

US 2019/0170083 A1 Jun. 6, 2019

Related U.S. Application Data

(62) Division of application No. 15/303,384, filed as application No. PCT/US2014/035907 on Apr. 29, 2014, now Pat. No. 10,233,863.

(51) Int. Cl.
*F02F 1/40* (2006.01)
*F16J 15/08* (2006.01)
(Continued)

(52) U.S. Cl.
CPC .............. *F02F 1/40* (2013.01); *F02F 1/14* (2013.01); *F16J 15/0818* (2013.01);
(Continued)

(58) Field of Classification Search
CPC ........ F02F 1/40; F02F 1/14; F02F 1/10; F16J 15/0818; F02B 75/045; F02D 15/02
See application file for complete search history.

(56) References Cited

U.S. PATENT DOCUMENTS 2,679,241 A 5/1954 Dickson
4,312,512 A 1/1982 Conte et al.
(Continued)

FOREIGN PATENT DOCUMENTS

CN 101036009 9/2007
WO WO-2012/092371 A1 7/2012

OTHER PUBLICATIONS

International Search Report and Written Opinion of the International Searching Authority issued in PCT/US2014/035907, dated Sep. 4, 2014.

*Primary Examiner* — Jacob M Amick
*Assistant Examiner* — Charles Brauch
(74) *Attorney, Agent, or Firm* — Foley & Lardner LLP

(57) ABSTRACT

A system and method for fluidly sealing a cylinder head interface between an engine block and a cylinder head of an internal combustion engine. An example apparatus includes a perimeter seal disposed on an outer periphery of the cylinder head. The perimeter seal has a first surface to abut a cylinder head sealing surface and a second surface to abut an engine block sealing surface. The perimeter seal is configured to prevent fluid from an external environment from entering the cylinder head interface and to allow fluid within the cylinder head interface to vent to the external environment when the fluid is above a predetermined pressure. A first fluid transfer tube seal fluidly seals a first fluid transfer orifice extending between the engine block and the cylinder head. The perimeter seal and the first fluid transfer tube seal are formed as a unitary structure.

14 Claims, 5 Drawing Sheets

(51) Int. Cl.
*F02F 1/14* (2006.01)
*F02B 75/04* (2006.01)
*F02D 15/02* (2006.01)
*F02F 1/10* (2006.01)

(52) U.S. Cl.
CPC ............ *F02B 75/045* (2013.01); *F02D 15/02* (2013.01); *F02F 1/10* (2013.01)

(56) References Cited

U.S. PATENT DOCUMENTS

| | | | |
|---|---|---|---|
| 5,062,393 A * | 11/1991 | Smith | F02F 1/004 123/41.72 |
| 5,072,697 A | 12/1991 | Sputhe | |
| 5,280,769 A | 1/1994 | Yates | |
| 5,343,837 A | 9/1994 | Ward et al. | |
| 5,603,515 A | 2/1997 | Bock | |
| 6,293,245 B1 | 9/2001 | Bock | |
| 7,500,459 B2 | 3/2009 | Koji | |
| 7,624,993 B2 | 12/2009 | Kikuchi et al. | |
| 2002/0027327 A1 | 3/2002 | Sugimoto et al. | |
| 2012/0223487 A1 | 9/2012 | Myers et al. | |

* cited by examiner

PRESSURE CONTROLLED DYNAMIC SEAL WITH CAPTURED FLUID TRANSFER TUBES

CROSS-REFERENCE TO RELATED APPLICATIONS

The present application is a divisional application of U.S. patent application Ser. No. 15/303,384, filed Oct. 11, 2016, which is the U.S. National Stage of PCT Patent Application No. PCT/US2014/035907, filed Apr. 29, 2014. The contents of these two applications are incorporated herein by reference in their entireties.

TECHNICAL FIELD

The present disclosure relates generally to the field of cylinder head sealing systems and methods.

BACKGROUND

Seals are used to fluidly seal interfaces, such as an interface between an engine block and a cylinder head of an internal combustion (IC) engine. Cylinder head seals (e.g., head gaskets) typically extend around cylinder bores of an IC engine to provide a combustion seal, which retains high temperature and high pressure gases within the cylinder bores. In addition, cylinder head seals (e.g., head gaskets or discrete seals) fluidly seal fluid transfer orifices that extend between the engine block and the cylinder head to communicate fluid (e.g., water, coolant, or oil) therebetween.

The interface between an engine block and a cylinder head is particularly difficult to seal for multiple reasons. For example, forces from the combustion process, especially for high combustion (e.g., diesel and natural gas) engines, force the engine block and the cylinder head apart, causing slight movement therebetween. In addition, that interface experiences significant thermal cycling due to the repeated heating and cooling of the engine. Further, the fasteners connecting the cylinder head to the engine block may be unevenly loaded, which can over-compress and/or under-compress certain portions of a cylinder head seal. Lastly, intake manifold overpressure (IMOP) events produce elevated peak cylinder pressures, which may result in charge leakage.

During IMOP events, charge leakage (e.g., high pressure exhaust gas) may travel through the interface between the cylinder head and the engine block and may leak into and/or damage one or more fluid transfer tubes, thereby contaminating the fluid (e.g., water, coolant, oil, etc.) contained therein. Such contamination can result in significant engine damage if not addressed immediately. To that end, some IC engines have replaced unitary cylinder head gaskets with a combustion seal and discrete fluid transfer tube seals. However, although certain combustion seals may survive an IMOP event without incurring damage, the individual fluid transfer tubes may incur damage from the charge leakage traveling through the interface. Furthermore, as the number of individual components increases, technicians may be more likely to forget to install one of the components during assembly or during a rebuild process. Additionally, while complicated valves are sometimes used to deal with IMOP events. such, valves may not respond to IMOP events fast enough, thereby causing significant engine damage.

SUMMARY

Various embodiments relate to an internal combustion engine. The internal combustion engine includes an engine block that defines a cylinder bore and a first fluid transfer orifice. The internal combustion engine also includes a cylinder head coupled to the engine block. The cylinder head defines a second fluid transfer orifice in fluid communication with the first fluid transfer orifice. An external environment surrounds the engine block and the cylinder head. The internal combustion engine also includes a cylinder head seal apparatus positioned at an interface between the engine block and the cylinder head. The cylinder head seal apparatus includes a perimeter seal disposed on an outer periphery of the cylinder head. The perimeter seal is configured to prevent fluid from the external environment from entering the interface and to allow fluid within the interface to vent to the external environment when the fluid is above a predetermined pressure. The cylinder head seal apparatus also includes a first fluid transfer tube seal to fluidly couple the first fluid transfer orifice and the second fluid transfer orifice The cylinder head seal apparatus is formed as a unitary structure.

Other embodiments relate to an apparatus for fluidly sealing a cylinder head interface between an engine block and a cylinder head of an internal combustion engine. The apparatus includes a perimeter seal disposed on an outer periphery of the cylinder head. The perimeter seal has a first surface to abut a cylinder head sealing surface and a second surface to abut an engine block sealing surface. The second surface is substantially opposite the first surface. The perimeter seal is configured to prevent fluid from an external environment from entering the cylinder head interface and to allow fluid within the cylinder head interface to vent to the external environment when the fluid is above a predetermined pressure. The apparatus also includes a first fluid transfer tube seal to fluidly seal a first fluid transfer orifice extending between the engine block and the cylinder head. The perimeter seal and the first fluid transfer tube seal are formed as a unitary structure.

Further embodiments relate to a method of installing a cylinder head seal apparatus on an internal combustion engine. The method includes providing an engine block of the internal combustion engine. The engine block defines a cylinder bore and a first fluid transfer orifice. A combustion seal is positioned on the engine block coaxial to the cylinder bore. A cylinder head seal apparatus is positioned on the engine block such that a fluid transfer tube seal of the cylinder head seal apparatus is disposed within a first counterbore adjacent and coaxial to the first fluid transfer orifice. A cylinder head of the internal combustion engine is aligned relative to the engine block such that the fluid transfer tube seal is disposed within a second counterbore adjacent and coaxial to a second fluid transfer orifice of the cylinder head. The fluid transfer tube seal provides fluid communication between the first and second fluid transfer orifices. The cylinder head is fastened to the engine block to sealingly engage the cylinder head seal apparatus between the engine block and the cylinder head.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
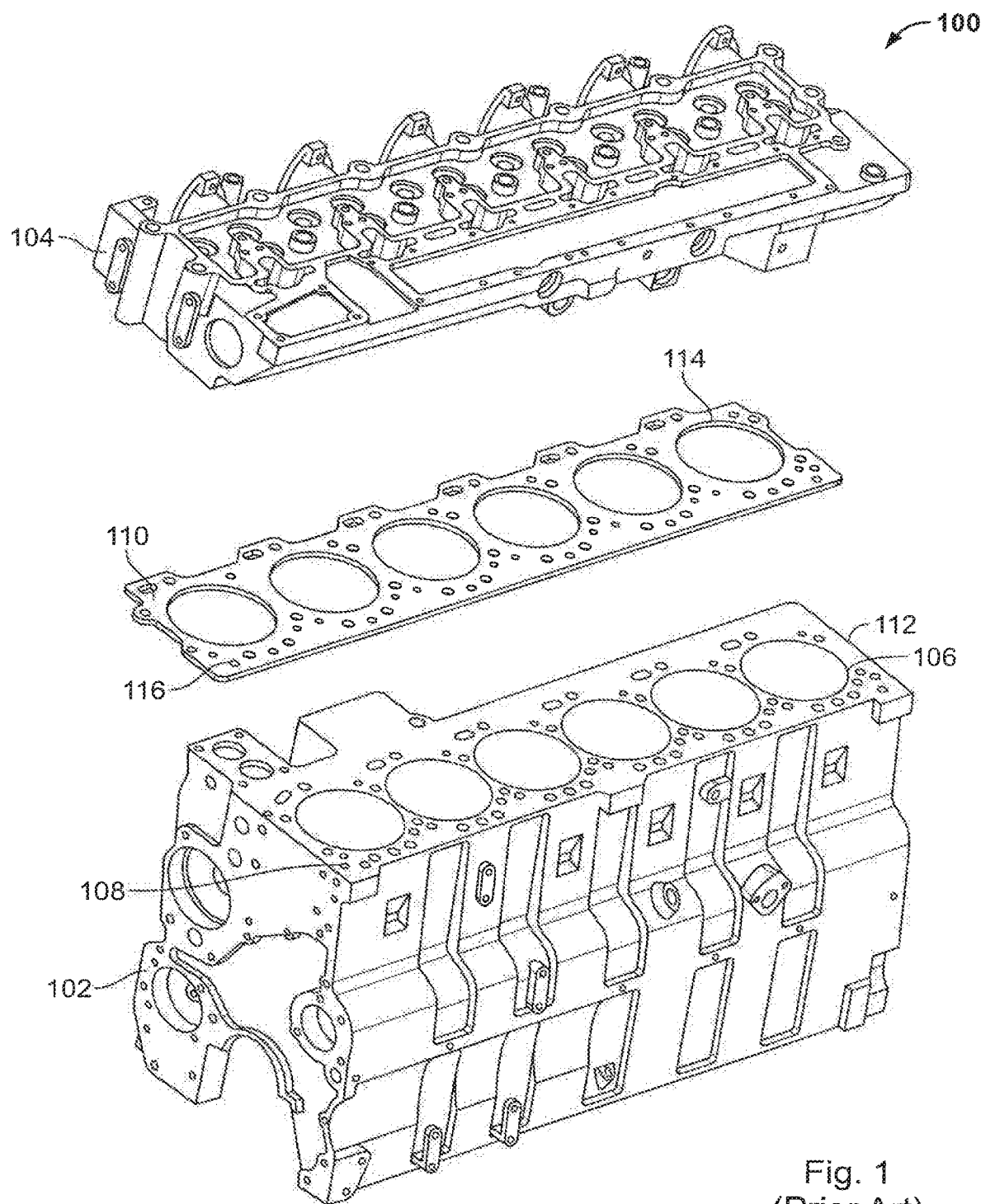
FIG. 1 is an exploded view of an internal combustion engine having a conventional cylinder head seal apparatus.

Referring to FIG. 1, an exploded view of an internal combustion (IC) engine 100 having a conventional cylinder head seal apparatus is illustrated. The IC engine 100 includes an engine block 102 and a cylinder head 104, which together define a plurality of cylinder bores 106. The engine block 102 and cylinder head 104 also define a plurality of fluid transfer orifices 108 that extend between the engine block 102 and the cylinder head 104. The fluid transfer orifices 108 transmit fluids (e.g., water, coolant, or oil) between the engine block 102 and cylinder head 104 to cool and/or lubricate the IC engine 100.

A cylinder head seal (e.g., head gasket) 110 seals an interface between the engine block 102 and the cylinder head 104. More specifically, the cylinder head seal 110 performs at least three separate sealing functions. Namely, the cylinder head seal 110 seals (1) the cylinder bores 106; (2) the fluid transfer orifices 108; and (3) a perimeter 112 of the interface. In the example IC engine 100 of FIG. 1, the cylinder head seal 110 performs all three sealing functions mentioned above. However, other IC engines utilize a plurality of discrete seals. The cylinder head seal 110 includes a plurality of cylinder apertures 114 to fluidly seal the cylinder bores 106 and a plurality of fluid transfer apertures 116 to fluidly seal the fluid transfer orifices 108. In addition, the cylinder head seal extends to the perimeter 112 to seal the perimeter 112 of the interface.

Cylinder head seals, such as the cylinder head seal 110 of FIG. 1, are exposed to extreme environmental conditions, such as significant variations in temperature and pressure. Intake manifold overpressure (IMOP) events in particular produce extreme pressure levels within the cylinder bores 106 such that excess gases may escape between the engine block 102 and the cylinder head 104, which may damage the cylinder head seal 110. Moreover, the excess gases produced during an IMOP event may contaminate the fluid within the fluid transfer orifices 108, which can accelerate the wear of the IC engine 100. If the cylinder head seal 110 is damaged, the IC engine 100 must be disassembled and the cylinder head seal 110 replaced to prevent further damage to the IC engine 100.

Certain conventional IC engines include discrete combustion seals to seal the cylinder bores 106 and a head gasket or individual seals to seal the fluid transfer orifices 108. Such sealing arrangements may allow pressure within the cylinder bores 106 during an IMOP event to vent to the external atmosphere. During such an event, the individual seals to seal the fluid transfer orifices 108 must maintain their respective sealing functions to avoid contamination. However, the excess pressure that is vented from the cylinder bores 106 may damage the individual seals.

Such conventional IC engines also typically include a perimeter seal to prevent fluid from the external environment (e.g., from a pressure washer) from leaking into the IC engine 100. However, during assembly and rebuild processes, the perimeter seal tends to block a direct view of the individual seals, which makes it more likely for a technician to forget to install an individual seal.

Figure 2A:
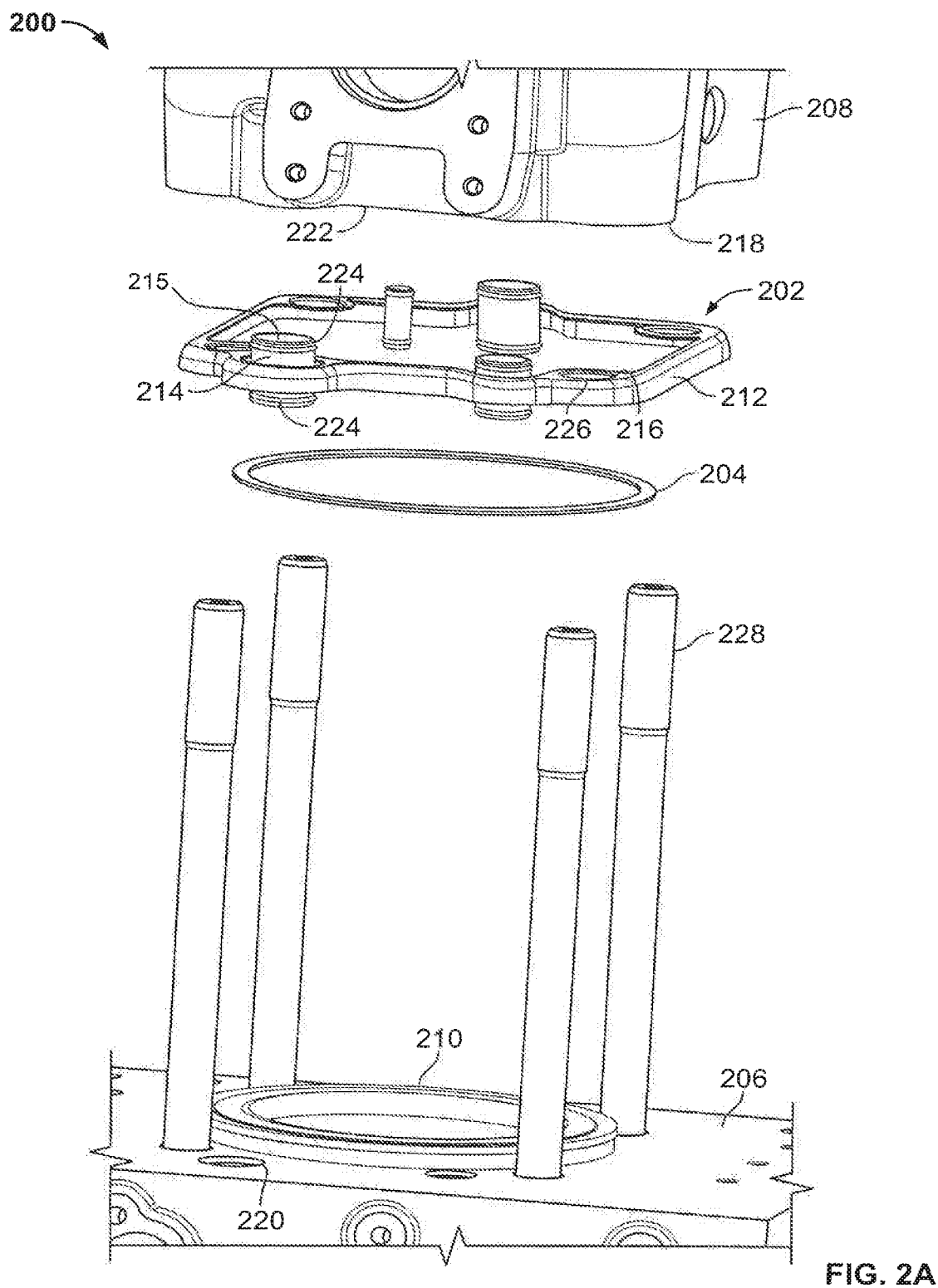
FIG. 2A is an exploded view of an internal combustion engine including a cylinder head seal apparatus according to an exemplary embodiment.

FIG. 2A is an exploded view of an IC engine 200 including a cylinder head seal apparatus 202 according to an exemplary embodiment. The cylinder head seal apparatus 202 and a combustion seal 204 are disposed between an engine block 206 and a cylinder head 208 of the IC engine 200. The IC engine 200 includes discrete cylinder heads 208 for each cylinder 210. However, in other exemplary embodiments, the IC engine 200 includes a unitary cylinder head 208 for each of a plurality of cylinders 210.

The combustion seal 204 is configured to retain combustion gas within the cylinder 210 during normal operation of the IC engine 200 and to allow combustion gas above a predetermined pressure (e.g., due to an IMOP event) to escape from the cylinder 210 and vent to the external atmosphere. Specifically, extreme pressure within the cylinder 210 caused by an IMOP event slightly lifts the cylinder head 208 from the engine block 206, thereby allowing combustion gas to escape from the cylinder 210 and past the combustion seal 204. The combustion seal 204 may be formed of a metal (e.g., steel) or metal alloy (e.g., stainless steel). In certain example embodiments, the combustion seal 204 is a discrete part that is separate from the cylinder head seal apparatus 202. However, in other embodiments, the combustion seal 204 is integrally formed with the cylinder head seal apparatus 202.

The cylinder head seal apparatus 202 is an assembly comprising a perimeter seal 212, fluid transfer tube seals 214 surrounding fluid transfer tubes 215, and stud seals 216. The perimeter seal 212 fluidly seals a perimeter 218 of the interface between the cylinder head 208 and the engine block 206, such that external fluids are prevented from leaking from an external environment past the perimeter 218 and into the interface between the cylinder head 208 and the engine block 206. However, the perimeter seal 212 is configured to allow combustion gas above a predetermined pressure to escape to the external environment during an IMOP event. In other words, the perimeter seal 212 fluidly seals the perimeter 218 of the interface between the cylinder head 208 and the engine block 206 from the outside in, but not from the inside out.

The perimeter seal 212 comprises a sealing material overmolded on a carrier. The sealing material comprises an elastomer (e.g., a fluoroelastomer), a thermoplastic (e.g., nylon or glass-reinforced nylon), or other suitable materials. The carrier is formed from a rigid material, such as a metal (e.g., steel), a metal alloy (e.g., stainless steel), a thermoplastic, or a composite material. The carrier provides a spacer between the engine block 206 and the cylinder head 208 to maintain the position of the perimeter seal 212 between the engine block 206 and the cylinder head 208.

The fluid transfer tube seals 214 include cylindrical fluid transfer tubes 215, which are typically formed of a rigid material, such as a metal (e.g., steel), a metal alloy (e.g., stainless steel), or a composite material. The fluid transfer tubes 215 fluidly couple first fluid transfer orifices 220 of the engine block 206 to second fluid transfer orifices 222 of the cylinder head 208. The first and second fluid transfer orifices 220, 222 communicate fluid, such as water, coolant, and/or oil between the engine block 206 and the cylinder head 208 to cool and/or lubricate the IC engine 200. The fluid transfer tubes 215 are also captured by the fluid transfer tube seals 214 during the overmolding process. In addition, the fluid transfer tube seals 214 may each include annular seals 224 (e.g., o-rings) to fluidly seal the fluid transfer tubes 215 and the first and second fluid transfer orifices 220, 222. In addition, the annular seals 224 prevent combustion gases from entering the first and second fluid transfer orifices 220, 222 during an IMOP event.

The fluid transfer tube seals 214 are configured to "float" relative to the engine block 206 and the cylinder head 208. Thus, the fluid transfer tube seals 214 maintain sealing engagement between the fluid transfer tubes 215 and the corresponding first and second fluid transfer orifices 220, 222 if there is relative movement between the cylinder head 208 and the engine block 206.

The stud seals 216 define apertures 226 to receive studs 228 extending from the engine block 206. The stud seals 216 prevent fluid (e.g., combustion gases) from traveling along the studs 228.

The cylinder head seal apparatus 202, according to the various embodiments, provides numerous advantages over conventional seal apparatus. For example, the cylinder head seal apparatus 202 is formed as a unitary structure (i.e., an item that is manufactured as a single, non-separable component) by overmolding the sealing material to capture the carrier and the fluid transfer tubes. In other examples, the cylinder head seal apparatus 202 is partially formed during a molding process and additional components are later assembled to form a unitary structure (i.e., a single, non-separable component). By utilizing a unitary structure, individual component part numbers are reduced, thereby simplifying assembly and rebuild operations, reducing the potential for assembly error, and simplifying inventory management systems.

In addition, the cylinder head seal apparatus 202 provides improved performance and reliability over exposure to numerous IMOP events. As mentioned above, the cylinder head 208 lifts slightly from the engine block 206 along a first axis during an IMOP event to allow combustion gases to escape from the cylinder 210 and past the combustion seal 204. Colloquially, this is known as engine "burp." During such an IMOP event, the cylinder head seal apparatus 202 "floats" between the engine block 206 and the cylinder head 208. The perimeter seal 212 permits the combustion gases to escape from the perimeter 218, while the fluid transfer tube seals 214 maintain their fluid sealing engagement with the first and second fluid transfer orifices 220, 222. The stud seals 216 and the fluid transfer tube seals 214 retain the position of the cylinder head seal apparatus 202 relative to the engine block 206 and the cylinder head 208 along a second axis perpendicular to the first axis during such an event. Thus, the cylinder head seal apparatus 202 is configured to retain its position and, therefore, its sealing capabilities after withstanding an IMOP event.

In certain example embodiments, the perimeter seal 212 and/or the engine block 206 include escape paths to control the path of exhaust gas during IMOP events. In certain example embodiments, the escape paths are molded into the perimeter seal 212 and/or machined or otherwise formed in the engine block 206. In other example embodiments, the perimeter seal 212 is formed to have localized variations in stiffness such that escape paths are effectively formed in portions of the perimeter seal 212 with the lowest localized stiffness, as those portions are most likely to deform under pressure. The escape paths are positioned to limit direct interaction between the exhaust gas and the stud seals 216 and/or the fluid transfer tube seals 214. Such escape paths minimize potential contamination between exhaust gas and the fluid within the fluid transfer tubes.

Many conventional IC engines require human intervention after undergoing an IMOP event because such events can cause permanent damage to engine seals and gaskets. For example, after undergoing an IMOP event that damages an engine seal or gasket, certain IC engines must be rebuilt to replace damaged seals and/or damaged engine components. Such rebuild processes are expensive and time consuming. Furthermore, operators risk further damaging IC engines if they are operated after an IMOP event, such as during a "limp home" mode. By being capable of withstanding multiple IMOP events without incurring damage, the cylinder head seal apparatus 202 provides superior reliability over conventional seal apparatus.

Figure 2B:
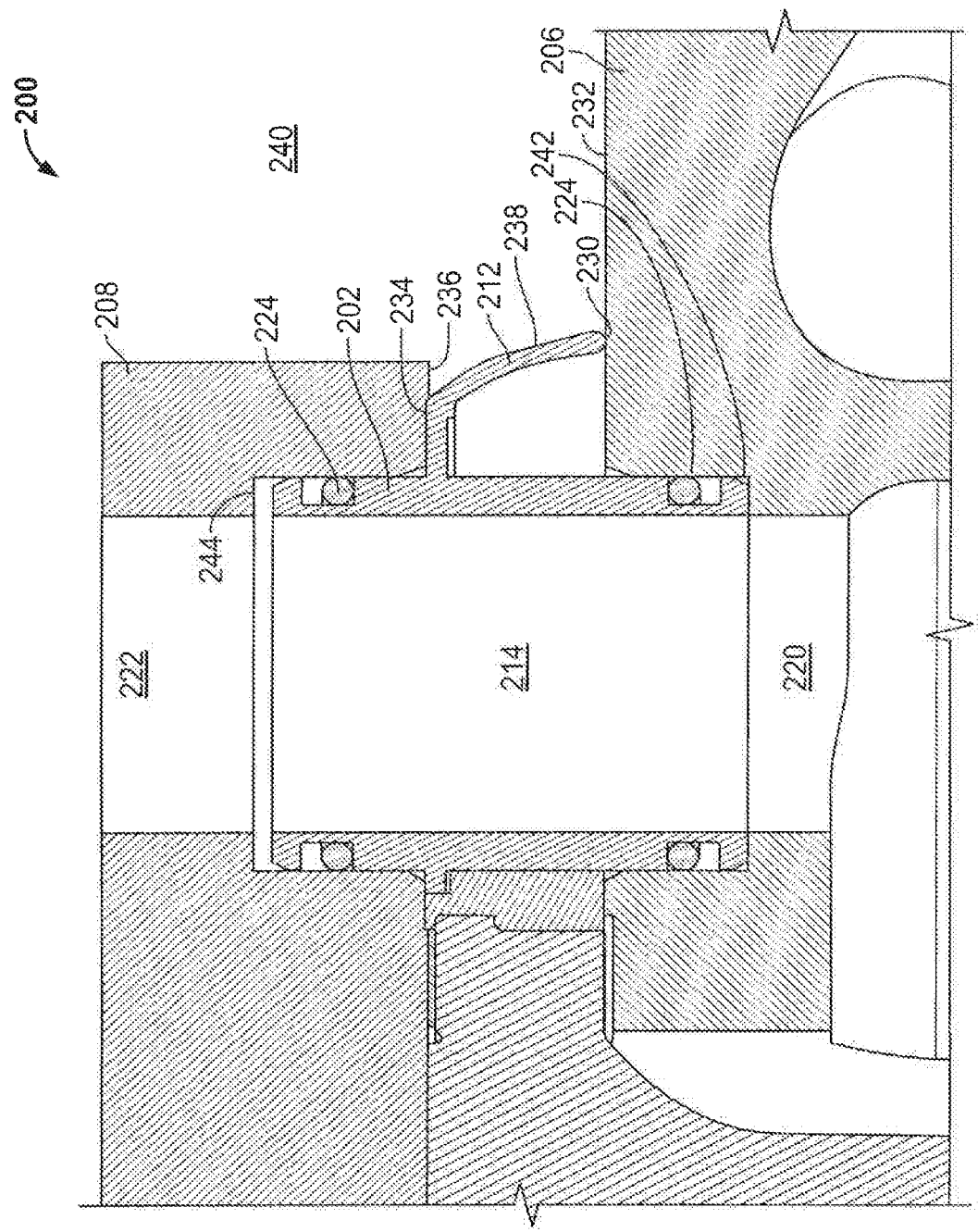
FIG. 2B is a partial cross-sectional detail view of the internal combustion engine including the cylinder head seal apparatus of FIG. 2A.

FIG. 2B is a partial cross-sectional view of the IC engine 200 including the cylinder head seal apparatus 202 of FIG. 2A. The perimeter seal 212 of the cylinder head seal apparatus 202 has a first surface 230 that abuts a sealing surface 232 of the engine block 206, and a second surface 234 that abuts a sealing surface 236 of the cylinder head 208. The perimeter seal 212 has an outer surface 238 that is configured to provide increasing sealing pressure as pressure applied thereto from an external environment 240 increases. As shown in FIG. 2B, the outer surface 238 of the perimeter seal 212 is convex (e.g., curved). As pressure is applied to the outer surface 238, the outer surface 238 tends to straighten. In doing so, the sealing pressure of the perimeter seal 212 increases. More specifically, the first surface 230 of the perimeter seal 212 is forced towards the sealing surface 232 of the engine block 206, and the second surface 234 of the perimeter seal 212 is forced towards the sealing surface 236 of the cylinder head 208, thereby increasing the sealing pressure of the first and second surfaces 230, 234 of the perimeter seal 217.

Figure 3:
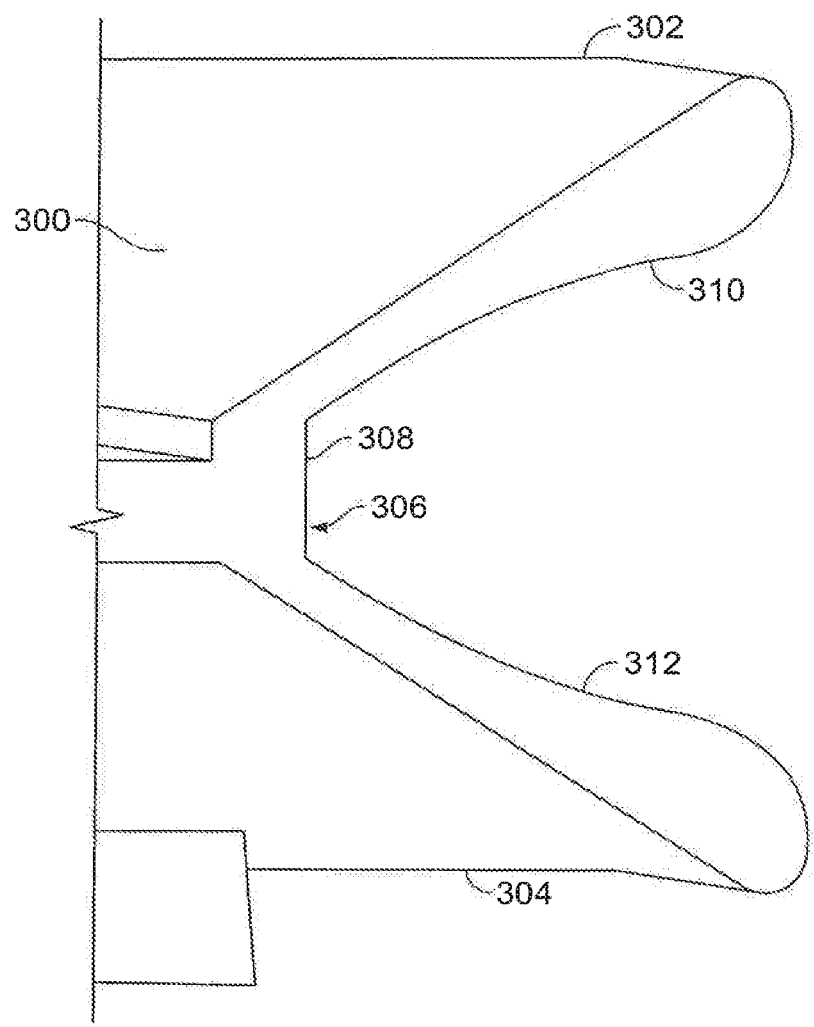
FIG. 3 is a cross-sectional view of a perimeter seal according to an exemplary embodiment.

FIG. 3 is a partial cross-sectional view of a perimeter seal 300 according to an exemplary embodiment. The perimeter seal 300 is an alternative embodiment of the perimeter seal 212 of FIGS. 2A and 2B. The perimeter seal 300 has a first surface 302 to abut a sealing surface of a cylinder head (e.g., the sealing surface 236 of FIG. 2B), and a second surface 304 to abut a sealing surface of an engine block (e.g., the sealing surface 232 of FIG. 2B). As with the perimeter seal 212 of FIGS. 2A and 2B, the perimeter seal 300 is configured to provide increasing sealing pressure as pressure applied thereto from an external environment increases.

The perimeter seal 300 has an external face 306 defined by a central wall 308 and first and second walls 310, 312 extending divergently from opposite ends of the central wall 308. In other words, each of the first and second walls 310, 312 have a cross-sectional thickness that generally decreases as the distance from the central wall 308 increases. The local stiffness of the first and second walls 310, 312 is proportional to their respective cross-sectional thicknesses at various points. In other words, the first and second walls 310, 312 are most stiff at points nearest the central wall 308 and least stiff at points furthest from the central wall 308. Therefore, as pressure is applied to the external face 306, the portions of the first and second walls 310, 312 furthest from the central wall 308 will deform the most, thereby increasing the pressure that each of the first and second walls 310, 312 apply to the sealing surfaces of the engine block and the cylinder head, respectively.

Turning back to FIG. 2B, the engine block 206 includes a first counterbore 242 coaxial to the first fluid transfer orifice 220 and the cylinder head 208 includes a second counterbore 244 coaxial to the second fluid transfer orifice 222. The fluid transfer tube seal 214 is disposed within both of the first and second counterbores 242, 244. The annular seals 224 fluidly seal the fluid transfer tube seal 214 against the first and second counterbores 242, 244 and prevent combustion gases from entering the first and second fluid transfer orifices 222, 222 during an IMOP event.

Figure 4:
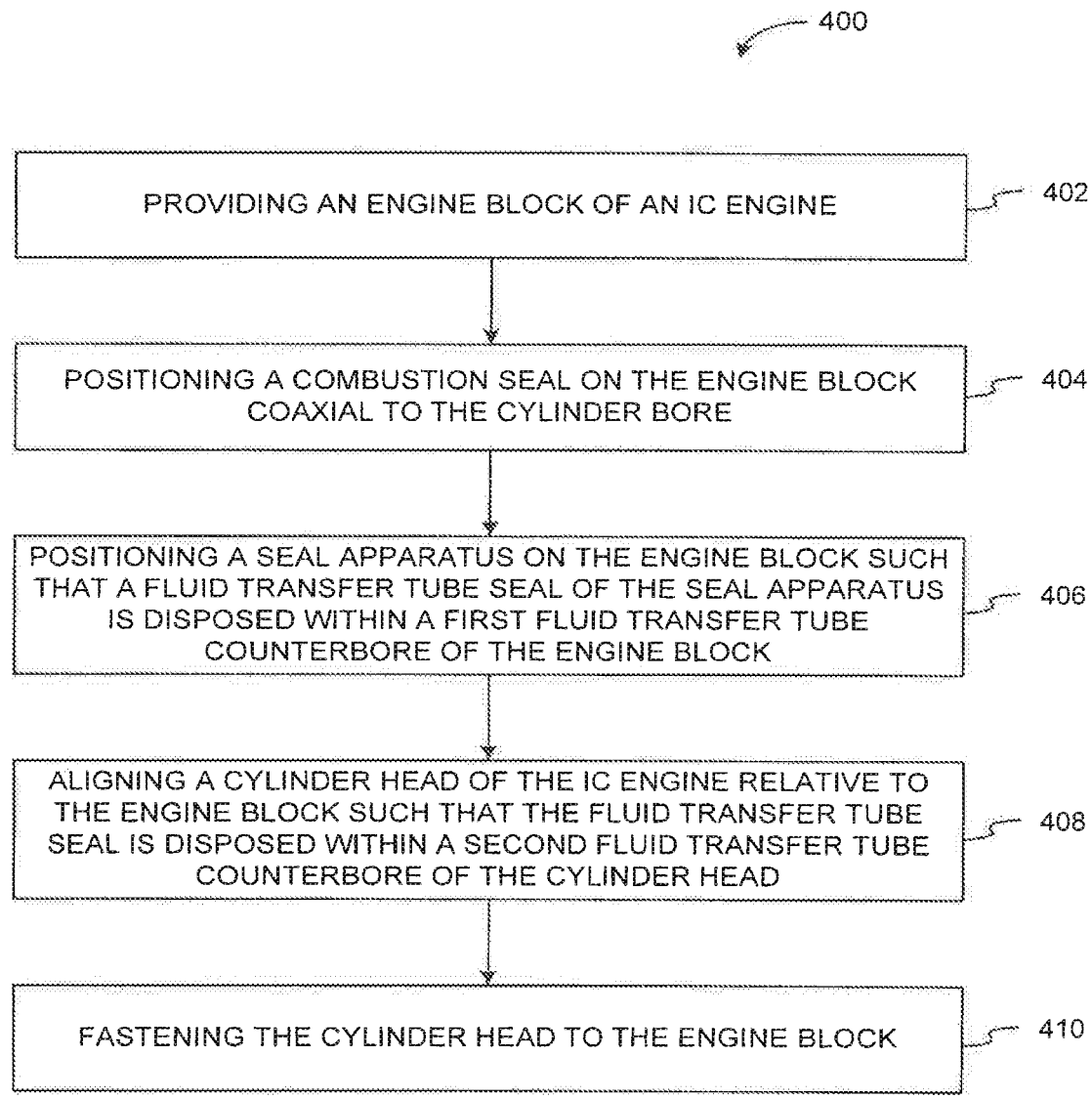
FIG. 4 is a flow diagram illustrating a method of installing a cylinder head seal apparatus according to an exemplary embodiment.

FIG. 4 is a flow diagram illustrating a method 400 of installing a cylinder head seal apparatus is shown according to an exemplary embodiment. For clarity and brevity, the method 400 is explained below in connection with the cylinder head seal apparatus 202 of FIGS. 2A and 2B. However, the method 400 can be performed in connection with the cylinder head seal apparatus 202 of FIGS. 2A and 2B.

At 402, an engine block (e.g., the engine block 206) of an IC engine (e.g., the IC engine 200) is provided. The engine block defines a cylinder bore (e.g., the cylinder 210) and a first fluid transfer orifice (e.g., the first fluid transfer orifice 220 of the engine block 206).

At 404, a combustion seal (e.g., the combustion seal 204) is positioned on the engine block such that the combustion seal is coaxial to the cylinder bore. In the exemplary embodiment of FIG. 4, the combustion seal is separate from the cylinder head seal apparatus. However, in other exemplary embodiments, the combustion seal is integrally formed with the cylinder head seal apparatus. In such embodiments, 404 and 406 are combined.

At 406, the cylinder head seal apparatus is positioned on the engine block such that a fluid transfer tube seal (e.g., the fluid transfer tube seal 214) of the cylinder head seal apparatus is disposed within a first counterbore adjacent and coaxial to the first fluid transfer orifice. The fluid transfer tube seal includes a cylindrical fluid transfer tube. In some examples, the fluid transfer tubes are press-fit into engagement with the first fluid transfer orifice.

Because the cylinder head seal apparatus is formed as a unitary structure, it is much easier to install than many conventional seal apparatus. Conventional seal apparatus utilize a perimeter seal and discrete fluid transfer tube seals. Typically, the perimeter seal blocks a direct view of the fluid transfer tubes, which makes it easy for a mechanic or technician to forget to install one of the individual seals. In addition, the fluid transfer tube seals and the stud seals of the cylinder head seal apparatus align the cylinder head seal apparatus relative to the engine block and the cylinder head. Thus, it is relatively simple for a mechanic or technician to reliably and repeatedly install or replace the cylinder head seal apparatus of the present disclosure.

At 408, a cylinder head (e.g., the cylinder head 208) of the internal combustion engine is aligned relative to the engine block such that the fluid transfer tube seal is disposed within a second counterbore adjacent and coaxial to a second fluid transfer orifice of the cylinder head. The fluid transfer tube seal assists a mechanic or technician in locating and positioning the cylinder head on the engine block. Once positioned, the fluid transfer tube seal and a fluid transfer tube disposed within the fluid transfer tube seal provide fluid communication between the first and second fluid transfer orifices such that fluids (e.g., water, coolant, or oil) can be communicated between the engine block and the cylinder head.

At 410, the cylinder head is fastened to the engine block to sealingly engage the cylinder head seal apparatus between the engine block and the cylinder head. Thus, the cylinder head seal apparatus fluidly seals the interface between the engine block and the cylinder head such that external fluids are prevented from leaking into the interface, while excessive combustion gas (e.g., due to an IMOP event) is vented to the external atmosphere.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. An apparatus for fluidly sealing a cylinder head interface between an engine block and a cylinder head of an internal combustion engine, the apparatus comprising:
    a perimeter seal configured to be disposed on an outer periphery of the cylinder head, the perimeter seal having a first surface configured to abut a cylinder head sealing surface and a second surface to abut an engine block sealing surface, the second surface opposite the first surface, wherein the perimeter seal is configured to prevent fluid from an external environment from entering the cylinder head interface and to allow fluid within the cylinder head interface to vent to the external environment when the fluid is above a predetermined pressure; and
    a first fluid transfer tube seal to fluidly seal a first fluid transfer orifice extending between the engine block and the cylinder head,
    wherein the perimeter seal and the first fluid transfer tube seal are formed as a unitary structure.

2. The apparatus of claim 1, further comprising a carrier, wherein the perimeter seal and the first fluid transfer tube seal are formed from a sealing material overmolded on the carrier.

3. The apparatus of claim 1, further comprising a fluid transfer tube disposed within the first fluid transfer tube seal to fluidly couple the first fluid transfer orifice between the engine block and the cylinder head.

4. The apparatus of claim 1, further comprising a plurality of stud seals, each of the plurality of stud seals defining an aperture to receive and to fluidly seal respective studs extending from the engine block sealing surface, wherein the plurality of stud seals are formed with the perimeter seal and the first fluid transfer tube seal as the unitary structure.

5. The apparatus of claim 4, wherein the apparatus is configured to float via the first fluid transfer tube seal and the plurality of stud seals during an intake manifold over pressure event that causes relative movement between the engine block and the cylinder head along a first axis, such that the position of the apparatus relative to the engine block and the cylinder head is maintained along a second axis perpendicular to the first axis.

6. The apparatus of claim 1, further comprising a combustion seal configured to be positioned at the cylinder head interface on a periphery of a cylinder bore defined by the engine block and the cylinder head, the combustion seal configured to fluidly seal the cylinder bore during normal engine operation and to allow fluid within the cylinder bore to escape the cylinder bore when the fluid is above a predetermined pressure, wherein the combustion seal is formed as a unitary structure with the perimeter seal and the first fluid transfer tube seal.

7. The apparatus of claim 1, further comprising a second fluid transfer tube seal to fluidly seal a second fluid transfer orifice extending between the engine block and the cylinder head, wherein the second fluid transfer tube seal is formed as a unitary structure with the perimeter seal and the first fluid transfer tube seal.

8. The apparatus of claim 1, wherein the apparatus defines an escape path to direct fluid flow within the cylinder head interface to the external environment during an intake manifold overpressure event, wherein the escape path is configured to direct fluid flow away from the first fluid transfer tube seal.

9. The apparatus of claim 1, wherein the perimeter seal provides a sealing pressure against the cylinder head sealing surface and against the engine block sealing surface, the sealing pressure increasing as pressure is applied to the perimeter seal from the external environment.

10. The apparatus of claim 9, wherein the perimeter seal comprises a convex outer surface configured to straighten as pressure is applied thereto, thereby increasing the sealing pressure of the perimeter seal against the cylinder head sealing surface and the engine block sealing surface.

11. The apparatus of claim 9, wherein the perimeter seal comprises:
   a central wall;
   a first wall extending at a first angle from a first end of the central wall towards the cylinder head sealing surface; and
   a second wall extending at a second angle opposite the first angle from a second end of the central wall opposite the first end towards the engine block sealing surface,
   wherein each of the first wall and the second wall include respective cross-sectional thicknesses that decrease with increasing distances from the central wall, wherein the first wall and the second wall are configured to deform as pressure is applied thereto such that the first wall increases its sealing pressure against the cylinder head sealing surface and the second wall increases its sealing surface against the engine block sealing surface.

12. A method of installing a cylinder head seal apparatus on an internal combustion engine, the method comprising:
   providing an engine block of the internal combustion engine, the engine block defining a cylinder bore and a first fluid transfer orifice;
   positioning a combustion seal on the engine block coaxial to the cylinder bore;
   positioning the cylinder head seal apparatus on the engine block such that a fluid transfer tube seal of the cylinder head seal apparatus is disposed within a first counterbore adjacent and coaxial to the first fluid transfer orifice, the first counterbore adjacent to a first end of the fluid transfer tube seal;
   aligning a cylinder head of the internal combustion engine relative to the engine block such that the fluid transfer tube seal is disposed within a second counterbore adjacent and coaxial to a second fluid transfer orifice of the cylinder head, the fluid transfer tube seal providing fluid communication between the first and second fluid transfer orifices, the second counterbore adjacent to a second end of the fluid transfer tube seal, the second counterbore spaced apart from the first counterbore; and
   fastening the cylinder head to the engine block to sealingly engage the cylinder head seal apparatus between the engine block and the cylinder head.

13. The method claim 12, wherein the combustion seal is integral to the cylinder head seal apparatus.

14. The method of claim 12, wherein the positioning of the cylinder head seal apparatus on the engine block includes coupling a fluid transfer tube within the fluid transfer tube seal with the first and second fluid transfer orifices.

* * * * *